United States Patent
Sygnat et al.

(10) Patent No.: US 12,134,851 B2
(45) Date of Patent: Nov. 5, 2024

(54) COST IMPROVED INTELLIGENT SENSOR

(71) Applicant: emz-Hanauer GmbH & Co. KGaA, Nabburg (DE)

(72) Inventors: Daniel Sygnat, Moosbach (DE); Johannes Baumer, Teunz (DE)

(73) Assignee: EMZ-HANAUER GMBH & CO. KGAA, Nabburg (DE)

( * ) Notice: Subject to any disclaimer, the term of this patent is extended or adjusted under 35 U.S.C. 154(b) by 1026 days.

(21) Appl. No.: 17/077,607

(22) Filed: Oct. 22, 2020

(65) Prior Publication Data

US 2021/0123176 A1  Apr. 29, 2021

(30) Foreign Application Priority Data

Oct. 23, 2019  (DE) .................. 102019007379.7

(51) Int. Cl.
*D06F 34/14* (2020.01)
*D06F 34/08* (2020.01)
*G01S 17/04* (2020.01)
*D06F 103/32* (2020.01)
*D06F 103/44* (2020.01)
(Continued)

(52) U.S. Cl.
CPC .............. *D06F 34/14* (2020.02); *D06F 34/08* (2020.02); *G01S 17/04* (2020.01); *D06F 2103/32* (2020.02); *D06F 2103/44* (2020.02); *D06F 2103/52* (2020.02); *D06F 2103/64* (2020.02)

(58) Field of Classification Search
CPC .......... D06F 34/04; D06F 34/08; D06F 34/14; D06F 34/22; D06F 34/24; D06F 37/087; D06F 2103/16; D06F 2103/18; D06F 2103/20; D06F 2103/22; D06F 2103/28; D06F 2103/32; D06F 2103/34; D06F 2103/44
See application file for complete search history.

(56) References Cited

U.S. PATENT DOCUMENTS 6,771,373 B2  8/2004  Schenkl et al.
8,531,670 B2  9/2013  Schenkl et al.
8,543,318 B2  9/2013  Ma et al.
(Continued)

FOREIGN PATENT DOCUMENTS

CN  102634960 A  8/2012
DE  102008056701 A1  6/2010
(Continued)

OTHER PUBLICATIONS

Machine Translation of KR-100378501-B1, Jun. 2003. (Year: 2003).*

*Primary Examiner* — David G Cormier
(74) *Attorney, Agent, or Firm* — Hayes Soloway PC

(57) ABSTRACT

A sensor for integration into a domestic washing machine or dishwasher includes a sensor housing and an electronic assembly accommodated in the sensor housing with sensor components for a plurality of different measurement functions. The measurement functions include at least an optical measurement function as well as at least one non-optical measurement function. The electronic assembly has a plug-in interface for an electrical connection plug where the plug-in interface has a plurality of electrical interface contacts for the electrical supply of the electronic assembly and for conducting away measurement information obtained by means of the measurement functions.

15 Claims, 3 Drawing Sheets

(51) Int. Cl.
*D06F 103/52* (2020.01)
*D06F 103/64* (2020.01)

(56) References Cited

U.S. PATENT DOCUMENTS

| | | | |
|---|---|---|---|
| 8,648,321 B2 | 2/2014 | Schenkel et al. | |
| 2008/0187056 A1* | 8/2008 | Gotoh | H04B 3/03 |
| | | | 375/377 |
| 2019/0060857 A1* | 2/2019 | Tincher | G01F 23/2921 |
| 2019/0387952 A1 | 12/2019 | Kessler et al. | |

FOREIGN PATENT DOCUMENTS

| | | |
|---|---|---|
| DE | 102011102327 A1 | 12/2011 |
| DE | 102010026068 A1 | 1/2012 |
| DE | 102011102627 A1 | 1/2012 |
| DE | 102016225887 A1 | 6/2018 |
| EP | 1245713 A1 | 10/2002 |
| EP | 1335060 A1 | 8/2003 |
| EP | 3290571 A1 | 3/2018 |
| KR | 100378501 B1 * | 6/2003 |

* cited by examiner

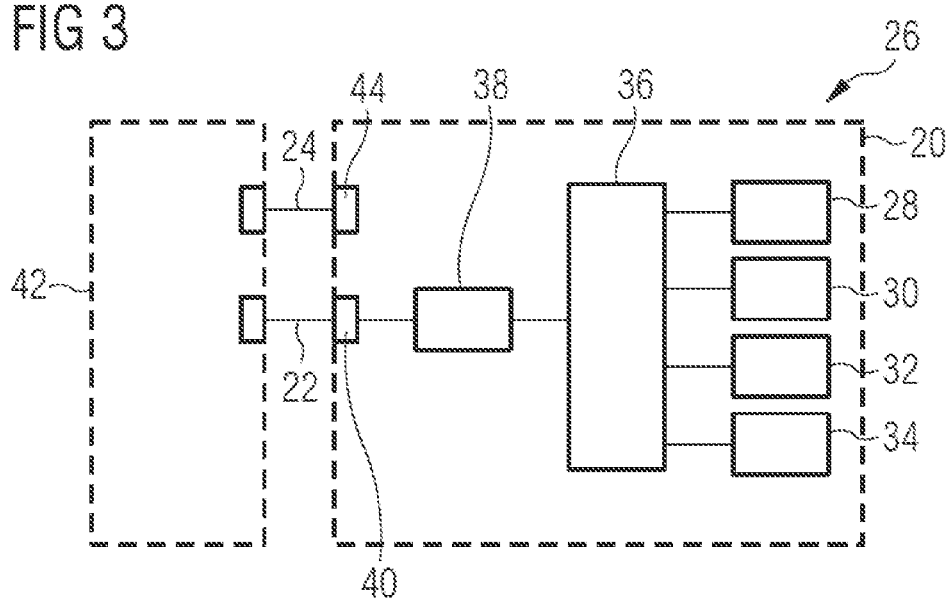
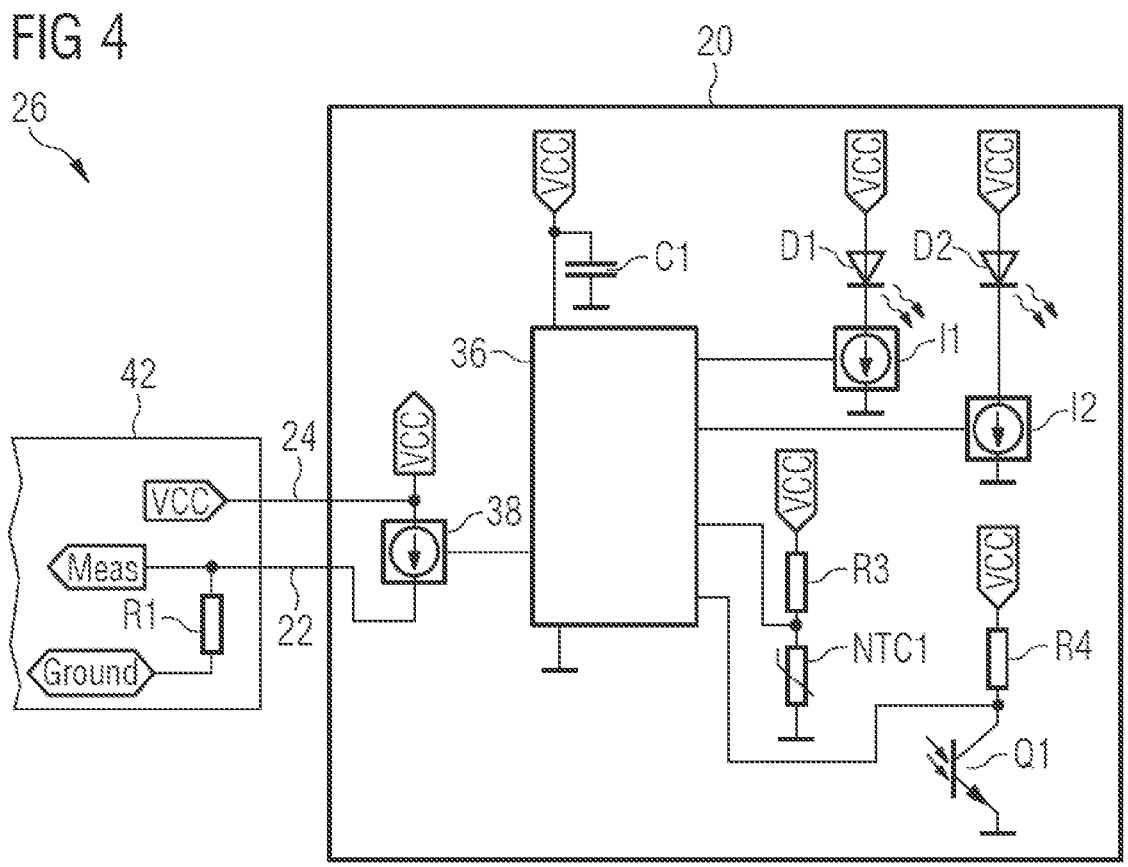

COST IMPROVED INTELLIGENT SENSOR

BACKGROUND OF THE INVENTION

1. Field of the Invention

The present invention relates generally to a sensor for integration into an electrical domestic appliance and to a domestic appliance equipped with such a sensor.

2. Description of the Prior Art

In household washing machines and dishwashers, sensors are commonly used to perform measurements on the working medium located in a working wet chamber of the machine (washing drum, dishwashing cabinet), i.e. the washing water in a washing machine or the wash liquor in a dishwasher. The measurements performed commonly comprise optical measurements, in order to determine, for example, the turbidity of the working medium and from this the degree of soiling of the laundry or the dishes and/or to determine the extent of foaming in the working medium. In addition to optical measuring capabilities of this kind, some conventional sensors include a temperature measurement function to determine the temperature of the working medium, and/or a conductance measurement function to determine the electrical conductance of the working medium. For the prior art in respect of conventional sensors for use in water-using domestic cleaning appliances, reference can be made, for example, to EP 1 335 060 B1, DE 10 2008 056 701 A1, DE 10 2010 026 068 A1 and DE 10 2011 102 627 A1.

Sensors of the type considered in the context of the present disclosure are customarily connected via an electrical connection cable to a main control unit of the domestic appliance. At its end close to the sensor, the cable has a plug connector, for which the sensor provides a plug socket into which the plug connector can be plugged. When the sensor and plug connector are plugged together, contact elements of the plug connector come into contact with contact elements of a plug-in interface of the sensor. The more contact elements the plug-in interface of the sensor has, the more cores the connection cable must have. Sensors of the type considered here are mass-produced items, with regard to which comparatively small unit cost savings can already lead to significant overall effects. Multicore connection cables are more expensive for the manufacturer of the domestic appliance than connection cables with a smaller number of cores. At the same time, however, a requirement exists for a functionality of the sensors discussed here that is as diverse as possible, i.e. sensors with a wide range of measurement functions are demanded of domestic appliance manufacturers. Each measurement function generates its own measuring signal, which is why a large number of measurement functions of the sensor entails a high core number of the connection cable if the individual measuring signals are to be led away from the sensor to the main control unit via separate cores of the cable.

SUMMARY OF THE INVENTION

One object of the invention is therefore to provide a sensor suitable for use in an electrical domestic appliance, for example a washing machine or a dishwasher, which can combine various types of measurement functions, yet is cost-efficient for the domestic appliance manufacturer.

An object can be seen in the provision of a sensor for an electrical domestic appliance that facilitates efficient and precise control of the domestic appliance.

An object can be seen in the provision of a sensor for an electrical domestic appliance that combines a plurality of measurement functions and at the same time has a compact design.

To achieve this object, according to one aspect of the invention a sensor is provided for cable connection to a main control unit of an electrical domestic appliance, wherein the sensor comprises an electrical sensor circuit accommodated in a sensor housing with a plurality of at least two measuring sensors arranged in different branch circuits, each of which sensors is designed to supply an electrical measuring signal, wherein the sensor circuit has a first electrical contact element for plug-in connection with a cable plug and is able to output measurement information obtained from the measuring signals of each of the plurality of measuring sensors via the first contact element.

The measurement information of interest can be contained in the measuring signals of the various measuring sensors in a different form. For example, in some of the measuring sensors, the amount of current of the measuring signal in question may be of interest, while in some other measuring sensors the voltage level of the measuring signal in question may be of interest. Alternatively or in addition, e.g. the time behaviour of the electrical measuring signal may be of interest in at least some of the measuring sensors. In certain embodiments, the sensor circuit is suitably designed to extract the interesting measurement information in each case from the measuring signals of the various measuring sensors and to output it in a uniform signal format, e.g. in the form of a pulse-width-modulated voltage signal (PWM signal) or in the form of an amplitude-modulated direct current signal, via a common contact element (namely the first contact element). Contact elements at the interface of the sensor to the cable plug and thus cores inside a connection cable can be saved by such evaluation and format standardisation of the measuring signals of the various measuring sensors.

In certain embodiments, a first of the measuring sensors is designed for an optical measurement function and a second of the measuring sensors is designed for a non-optical measurement function.

In certain embodiments, the plurality of measuring sensors comprises at least one opto-electronic measuring sensor and in addition at least one other, non-opto-electronic measuring sensor, in particular a temperature-dependent electrical resistor element and/or an arrangement of conductivity electrodes.

In certain embodiments, one of the measuring sensors is designed to measure the optical transmission along a light measurement path running partly outside of the sensor housing and/or to detect the nature of an external medium adjacent to an outside measuring surface of the sensor housing by means of a measuring light beam aimed in the direction of the measuring surface.

In certain embodiments, one of the measuring sensors provides a temperature measurement function and/or a measurement function to determine the electrical conductance along a conductance measuring section running outside of the sensor housing.

In certain embodiments, the sensor circuit is adapted to control the sensor, in particular the measuring sensors, depending on control information received via the first contact element.

In certain embodiments, the sensor circuit comprises an electrical resistor element, which is connected on an output side to the first contact element and on an input side to a signal line of the sensor circuit, wherein the sensor circuit is adapted to output the measurement information by means of a voltage signal via the signal line.

In certain embodiments, the sensor circuit is adapted to determine the control information from a comparison between a voltage present on the input side of the resistor element and a voltage present simultaneously on the output side of the resistor element.

In certain embodiments, the comparison comprises determining one or more time sections, in which only one of the voltage present on the input side of the resistor element and the voltage present on the output side of the resistor element exceeds a predetermined limit value.

In certain embodiments, the sensor circuit receives control information via a first (e.g. the common) contact element of the plug-in interface and controls at least one of the measuring sensors based on the control information. The sensor circuit can output, via the first contact element of the plug-in interface, first measurement information obtained by means of an optical measurement function of the sensor circuit and/or second measurement information obtained by means of a non-optical measurement function of the sensor circuit. The control information can be determined by the sensor circuit on the basis of a (e.g. time-varying) voltage present at the first contact element. The control information can be determined by the sensor circuit on the basis of a comparison of the voltage present at the first contact element relative to a voltage outputted simultaneously by the sensor circuit (e.g. via the first electrical resistor element) for applying to the first contact element. The voltage outputted by the sensor circuit can be a PWM voltage signal and/or represent the measurement information. The comparison can comprise a determination of one or more points in time and/or one or more time sections, in which only one of the two voltages (e.g. the voltage outputted by the sensor circuit) exceeds a predetermined limit value. Such determinable sections can be arranged periodically, have different durations and in particular have the form of a PWM signal from the viewpoint of time. All such determinable sections are each longer, for example, than a maximum period duration of the voltage signal outputted by the sensor circuit. The sensor circuit can put the sensor into a state of rest based on the control information.

In certain embodiments, the sensor circuit has a second electrical contact element for plug connection to the cable plug and is designed to obtain an electrical supply direct voltage via the second contact element.

In certain embodiments, the sensor circuit has a third electrical contact element for plug connection to the cable plug, wherein parts of the sensor circuit to be put at a reference potential are connected to the third contact element.

In certain embodiments, the sensor circuit has a plug-in interface for an electrical connection plug (e.g. the electrical cable plug), wherein the plug-in interface has a plurality of electrical contact elements for the electrical supply to the sensor circuit and to conduct the measurement information away, wherein the plurality of electrical contact elements comprises the first electrical contact element, and wherein the total number of contact elements of the plug-in interface is two or three.

Alternatively or in addition, the sensor circuit can conduct away first measurement information obtained by means of an optical measurement function of the sensor circuit and second measurement information obtained by means of a non-optical measurement function of the sensor circuit via a common contact element of the plug-in interface.

In certain embodiments, the sensor circuit comprises an integrated circuit with separate signal inputs for an electrical measuring signal of an optical measurement function and an electrical measuring signal of a non-optical measurement function of the electronic assembly, and with a common signal output for measurement information of the optical measurement function and the non-optical measurement function derived from the measuring signals.

With reference to the sensor circuit being accommodated in the sensor housing, this does not mean that the sensor circuit must be arranged completely inside the sensor housing and may not protrude anywhere from the sensor housing. It is thus readily conceivable that e.g. a circuit board as a carrier of electrical and/or electronic components of the sensor circuit with a board area acting as a plug-in interface protrudes at least a portion out of the sensor housing. The connection of the sensor circuit to a connection cable leading to a main control unit of the domestic appliance can be produced by plugging a circuit board plug arranged at one end of the connection cable onto the board area of the circuit board.

In certain embodiments, the sensor housing has a housing base designed in a pot-like manner and two housing fingers protruding relative to the housing base.

In certain embodiments, the sensor circuit comprises at least one further measuring sensor and conducts away all measurement information obtained by means of the measuring sensors of the sensor circuit via a common contact element.

The invention further provides a water-using domestic cleaning appliance with a working wet chamber that can be closed by a door, a sensor of the type explained above for performing measurements on a working medium present in the working wet chamber, and an electronic main control unit connected to the sensor via a cable connection, which unit controls the operation of the domestic cleaning appliance based on the measurements performed by the sensor.

The invention is explained further below on the basis of the enclosed drawings.

BRIEF DESCRIPTION OF THE DRAWINGS

FIG. 3 is a schematic representation of a domestic appliance with the sensor.

FIG. 4 is a representation of a circuit of the domestic appliance with the sensor.

DETAILED DESCRIPTION OF THE INVENTION

Figure 1:
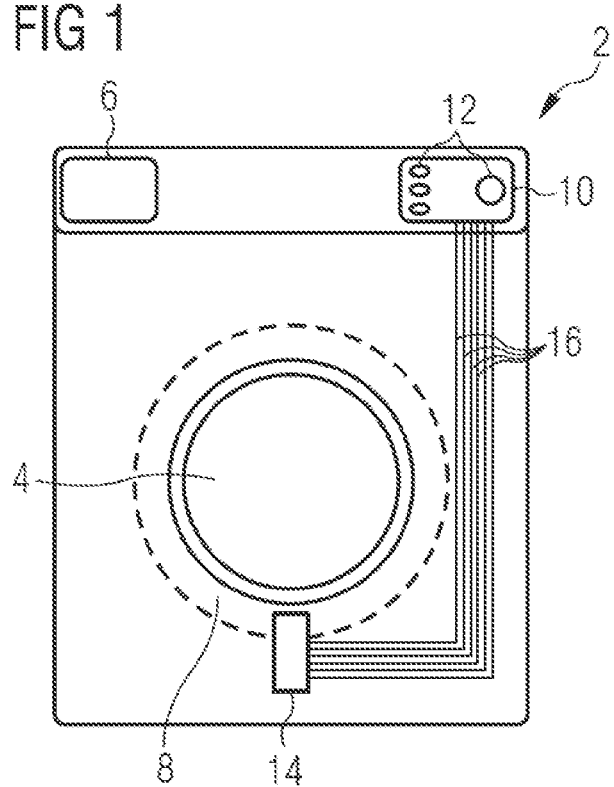
FIG. 1 is a schematic representation of a known washing machine.

Reference is made first to FIG. 1, which shows a schematic representation of a conventional washing machine 2. The washing machine 2 comprises an opening 4 for loading the washing machine with laundry, and a detergent compartment 6, which can be filled with detergent. In a washtub that is not depicted in further detail inside the washing machine 2, a washing chamber 8 is formed in which a washing process can take place. The washing chamber 8 can be closed by a door (not depicted). The washing machine 2 further comprises an operating console 10 with several operating elements 12, such as buttons, rotary knobs and displays, for example. The operating console 10 is connected to a control unit (not depicted) of the washing machine 2.

A sensor 14 is arranged in the washing machine 2. In the example shown, the sensor 14 protrudes into the washing chamber 8, wherein—as also shown in the documents of the prior art cited in the introduction—it can protrude into the washing chamber 8 with, for example, two housing fingers of a sensor housing of the sensor 14 that project relative to a pot-shaped housing base. The sensor 14 comprises several measuring sensors (not depicted in FIG. 1) for measuring parameters such as, for example, a received light intensity, the temperature of the washing water in the washing chamber 8 and/or the electrical (if applicable complex) conductance of the washing water. It should be recognised that a comparatively large number of signal lines 16 is necessary to connect the sensor 14 to the control unit.

Figure 2:
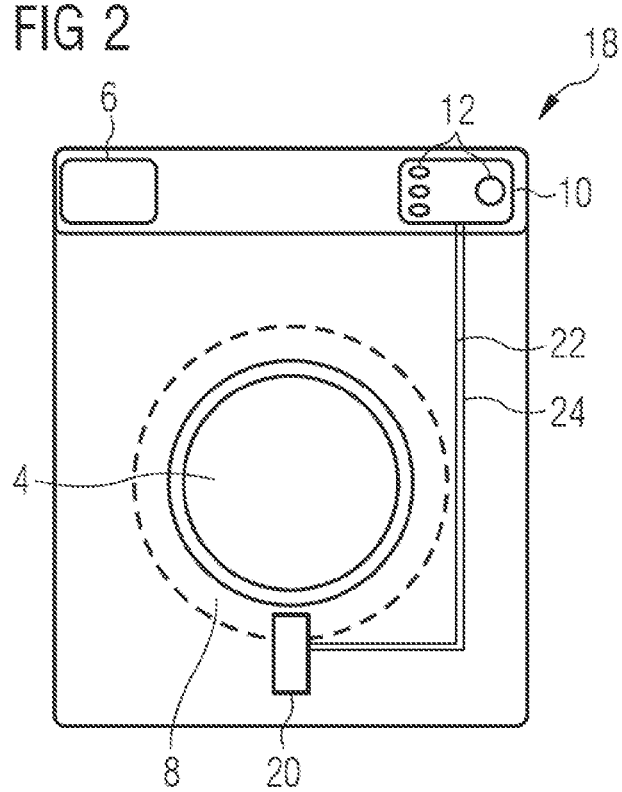
FIG. 2 is a schematic representation of a washing machine with a sensor.

In contrast, FIG. 2 depicts an example of a domestic appliance according to the invention. This example is an electrical, water-using domestic cleaning appliance, namely a washing machine 18. The washing machine 18 comprises some of the components already described for FIG. 1, which are represented by the same reference characters. The washing machine 18 further comprises a main control unit (not depicted). The washing machine 18 in FIG. 2 comprises a different sensor 20 than the washing machine 2 from FIG. 1, however. The difference of the sensor 20 is not expressed or at any rate not only expressed in the design of a sensor housing of the sensor 20 compared with the sensor 14 in FIG. 1, but is rather expressed at least in the circuit configuration of the sensor electronics accommodated inside such a sensor housing.

The sensor 20 specifically comprises several measuring sensors, which each supply a dedicated electrical measuring signal representative of a magnitude to be measured. Via a common electrical contact element (not depicted in FIG. 2), the measurement information transported in these measuring signals is outputted by the sensor 20 at an electrical plug-in interface of the sensor 20 serving for plug connection to a connection plug. A signal line (cable core) 22 contained in a connection cable, which bears the connection plug at one cable end and which serves to connect the sensor 20 to a main control unit of the washing machine 18, transports the measurement information of the various measuring sensors from the common contact element to the main control unit. In the example depicted, the connection cable also contains a voltage supply line 24, which is connected to a second electrical contact element (not depicted) of the plug-in interface of the sensor 20 when the cable is plugged in at the sensor 20. The line (core) 24 serves to supply a supply direct voltage of +5V, for example, to the sensor 20. It is clear that in contrast to the washing machine 2 from FIG. 1, fewer lines (cores) have to be provided to connect the sensor 20 to the main control unit of the washing machine 18.

FIG. 3 shows a schematic representation of a domestic appliance 26 with the sensor 20 already described for FIG. 2. The domestic appliance 26 is, for example, the washing machine 18 from FIG. 2. The sensor 20 comprises several measuring sensors 28, 30, 32 and 34. In this case the first measuring sensor is provided with the reference character 28 and the second measuring sensor with the reference character 30. A third measuring sensor 32 and a fourth measuring sensor 34 are likewise depicted. It is understood that the number of measuring sensors is not restricted to four and that instead any other plurality of at least two measuring sensors can be contained in the sensor 20. At least one of the measuring sensors 28-34 can be a photodetector (photodiode, phototransistor), for example, at least another of the measuring sensors 28-34 can be a temperature-dependent electrical resistor element (thermistor, PTC thermistor), for example, and at least one other of the measuring sensors 28-34 can comprise an array of conductivity electrodes, for example, in order to perform conductance measurements on an external medium (e.g. washing water) surrounding the sensor 20.

The electrical measuring signals generated by the measuring sensors 28, 30, 32 and 34 are transmitted to an evaluation unit 36. The evaluation unit can be an integrated circuit (chip in colloquial terms), e.g. in the form of a microcontroller or a microprocessor. The measuring signals of the measuring sensors that are received by the evaluation unit 36 are used to control an output unit 38. The output unit 38 is adapted to generate, controlled by the evaluation unit 36, an output signal, which contains or represents the measurement information. The output signal is a time-variable electric voltage or a time-variable electric current. The evaluation unit 36 can be part of the output unit 38 and vice versa.

The output unit 38 can output the output signal as an analog signal, e.g. as a voltage value in a range from 0 V to 5 V. Alternatively, the output signal can be a PWM signal.

In another configuration, which is explained in greater detail with reference to FIG. 4, the sensor 20 contains a constant current sink and from the viewpoint of the main controller always "draws" a minimal current, for example at least 20 mA. This minimal current is used to supply the electrical components of the control unit 20. The output signal can be readable by the control unit 42 in this case as additional current, for example in a range from 0 to 10 mA. In one example, a current of 20 mA corresponds to a water turbidity level of 0%, a current of 25 mA to a water turbidity level of 50%, and a current of 30 mA to a water turbidity level of 100%. The water turbidity level is determined as measurement information in this case by the evaluation unit 36 from an electrical measuring signal or several electrical measuring signals. Other measurement information obtained from the measuring signals (thus e.g. a temperature of 25° C., a temperature of 50° C. etc.) can naturally also be mapped by different current values in the output signal. Conversion of absolute measuring values from the measuring signals into relative values (e.g. into percentage values) is possible, for example in relation to a maximum measuring range (e.g. between −40° C. and 350° C.) or a selected measuring range (e.g. between 20° C. and 90° C.).

Alternatively to the analog variants, the output signal can be coded according to a bus, for example according to a 1-wire interface. Such a bus is conceivable as a 2-wire or 3-wire variant, thus can be provided in the embodiments from FIGS. 2 to 6.

The output unit 38 is further adapted to output the output signal via the first electrical contact element 40. The first electrical contact element 40 is connected to the signal line 22. The signal line 22 is connected in turn to the main control unit 42 of the domestic appliance 26.

The voltage supply line 24 is connected to the second electrical contact element 44 of the sensor 20. The second electrical contact element 44 serves the voltage supply to the evaluation unit 36. The second electrical contact element 44 can also supply the measuring sensors 28, 30, 32 and 34 and the output unit 38 with electric voltage, which is made available to the sensor 20 via the voltage supply line 24. Alternatively, the first electrical contact element 40 can serve for the voltage supply of the sensor 20.

In certain embodiments, control information is picked up or received via the first contact element 40 of the sensor 20. In this case the sensor preferably comprises maximally or exactly three contact elements, as explained further below with reference to FIG. 5. The control information is determined by the sensor 20, in particular by the evaluation unit 36, at least on the basis of a voltage present at the first contact element 40. In one example, the evaluation unit 36 determines points in time or time sections in which, although the voltage signal of the output unit 38 conducted via a first electrical resistor element to the first contact element 40 has a voltage that fulfils a predetermined first limit value (e.g. is above the first limit value), the voltage actually present at the contact element 40 does not fulfil a second limit value (e.g. lies below the second limit value, wherein the second limit value is lower than the first limit value). The voltage present at the first contact element can be determined by the evaluation unit 36 by means of a measuring line connected to the first contact element via a second electrical resistor element.

The (e.g. first and/or second) electrical resistor element is configured to have a different voltage on an input side than on an output side. The voltage drop between the input and the output side can be linear or non-linear to a current that flows through the resistor element. The resistor element can comprise a plurality of passive and/or active electrical components. For example, the electrical resistor element comprises one or more linear electrical resistors and/or one or more non-linear resistors.

In other words, a voltage at the first contact element 40 can be "pulled to ground" at certain time intervals by a cable core of the domestic appliance connected thereto, wherein the time intervals encode the control information. At the sensor 20, the voltage present at the first contact element 40 (which voltage is present e.g. on the output side of the first electrical resistor element) can be compared with a voltage outputted by the output unit 38 to apply to the resistor element (which voltage is present e.g. on the input side of the first electrical resistor element). Lengths and/or time sequences of time intervals, in which a low voltage (e.g. between 0% and 25% of an operating voltage of the sensor 20, for example between 0 and 1 volt) is measured at the first contact element 40, although a high voltage (e.g. between 75% and 100% of the operating voltage of the sensor 20, for example between 4 and 5 volts) is outputted simultaneously to apply to the resistor element, can be used to transmit the control information. A simultaneous transmission of information from the sensor 20 in the direction of the domestic appliance and vice versa can be enabled hereby. It can be said that information can be transmitted from the sensor 20 in the direction of the domestic appliance based on pulse width modulation, while information can be transmitted to the sensor 20 by a control unit of the domestic appliance by a targeted voltage reduction at the first contact element 40. The voltage reduction carried out by the control unit of the domestic appliance, for example, can have the form of a PWM signal, wherein the pulses should be longer than a maximum period duration of the (e.g. PWM) voltage signal outputted by the output unit 38 to apply to the resistor element.

According to one variant, which can be provided additionally or alternatively, the voltage at the first contact element 40 is "set to the supply voltage of the sensor 20" by the cable core of the domestic appliance connected thereto at certain time intervals, wherein the time intervals encode the control information. In this case, lengths and/or time sequences of time intervals, in which a high voltage (e.g. between 75% and 100% of the operating voltage of the sensor 20, for example between 4 and 5 volts) is measured at the first contact element 40, although a low voltage (e.g. between 0% and 25% of an operating voltage of the sensor 20, for example between 0 and 1 volt) is outputted simultaneously to apply to the resistor element, can be used to transmit the control information.

Based on the control information, a function of the measuring sensors of the sensor 20 can be controlled and/or the sensor 20 can be put into a state of rest. Before the sensor 20 switches to rest mode, electrical consumers of the sensor circuit, for example an LED for providing the turbidity measurement function, can be switched off. A constant voltage value can then be outputted by the output unit 38 to apply to the resistor element. A change in the voltage present at the first contact element 40 from the high voltage to the low voltage can reactivate the sensor 20 from the rest mode. Electrical energy can be saved hereby without the sensor 20 having to be disconnected from the supply voltage.

The output of measurement information by the evaluation unit 36 can be controlled via a time-varying voltage or current signal that is applied by the main control unit 42 to the voltage supply line 24. The evaluation unit 36 can be controlled such that only measuring signals of certain measuring units are generated, for example only measuring signals of the first measuring sensor 28 and the second measuring sensor 30. The evaluation unit 36 can also be controlled such that the measuring signals are generated with a certain periodicity. Furthermore, the evaluation unit 36 can be controlled such that the measurement information is generated by using certain parameters. In this case control is conceivable such that measurement information is generated with certain maximal amounts or with a certain scaling. The evaluation unit 36 can be controlled such that the output signal generated contains linked or offset measurement information of one or more of the measuring sensors 28, 30, 32 and 34. Other types of control are also possible.

For example, at a point in time, measurement information obtained by the evaluation unit 36 on the basis of an electrical signal of a measuring sensor is transmitted respectively with the output signal. The main control unit 42 can inform the evaluation unit 36 which information this should be by the main control unit 42 switching the supply voltage of the sensor 20 on and off in a pulsed manner or by it pulling the voltage at the first contact element 40 to ground in a pulsed manner or setting it to the supply voltage of the sensor 20. Each pulse corresponds to a brief disconnection of the supply voltage or a brief reduction or increase in the voltage by a cable core connected to the first contact element 40 of a duration of a few milliseconds, for example. The evaluation unit 36 of the sensor 20 recognises these pulses. The number of pulses, or the binary code transmitted, corresponds to a certain function of the sensor 20. One pulse signifies, for example, that a turbidity measurement is to be performed by means of a light absorption sensor with a light detector as measuring sensor, two pulses signify that a temperature measurement is to be performed by means of a temperature sensor with a temperature probe as measuring sensor, etc. Instead of the number of pulses, the pulse duration can be used to transmit this control information to the sensor 20. Starting out from this control by the control unit 42, the evaluation unit 36 then obtains the measurement information from the electrical measuring signals. With appropriate control of the sensor 20, the output unit 38 generates an output signal that contains measurement information of different measuring sensors in time sequence. The evaluation unit 36 can activate one or more of the measuring sensors 28, 30, 32 and 34 to receive the electrical measuring signals of the activated measuring sensors 28, 30, 32 and 34. Alternatively or in addition, the evaluation unit 36 can select an electrical measuring signal of one of the measuring sensors 28, 30, 32 and 34 or several electrical measuring signals of several of the measuring sensors 28, 30, 32 and 34 to obtain the measurement information.

According to the example from FIG. 3, the sensor 20 comprises maximally two electrical contact elements for connection to lines of the domestic appliance 26, one of which is the first electrical contact element 40, and another of which is the second electrical contact element 44. In particular, the sensor 20 comprises a maximum of one electrical contact element for transmitting the measurement information to the control unit 42, wherein the measurement information was obtained from the measuring signals of each of the measuring sensors. Thus only a single signal line 22 is required for the transmission of the measurement information.

The sensor 20 comprises a circuit board (not depicted), on which the measuring sensors 28, 30, 32 and 34, the evaluation unit 36, the output unit 38, the first electrical contact element 40 and the second electrical contact element 44 are arranged. The circuit board is at least partially arranged in a watertight housing of the sensor 20.

FIG. 4 shows a representation of a circuit of the domestic appliance 26 in FIG. 3. The evaluation unit 36 is connected to the output unit 38. Here the output unit 38 is a current source, which is controlled by signals of the evaluation unit 36. In other words, the measurement information obtained by the evaluation unit 36 is used here to control the output unit 38, wherein the output unit 38 generates a time-variable current signal as the output signal depending on the measurement information and transmits the output signal via the first electrical contact element 40 and via the signal line 22 to the main control unit 42. It is clear that only the one signal line 22 is required to transmit the measurement information of the measuring sensors from the sensor 20 to the main control unit 42.

The evaluation unit 36 is supplied by the supply voltage VCC. To eliminate any high-frequency voltage components, a protective capacitor C1 is provided, which does not necessarily have to be provided, however.

Arranged in the main control unit 42 is an electrical resistor R1, which is connected to the reference potential of the main control unit 42. This serves to convert the transmitted time-variable current signal into a time-variable voltage signal, which can then be processed further as signal "Meas" by the main control unit 42. The main control unit 42 provides a supply voltage VCC, which is conducted via the voltage supply line 24 to the second electrical contact element 44. The supply voltage VCC is used in the sensor 20 to supply the evaluation unit 36, the output unit 38 and the measuring sensors 28, 30, 32 and 34.

In the embodiment shown, an electrical resistor NTC1 with a negative temperature coefficient as temperature probe is provided as the second measuring sensor 30. The electrical resistor R3 can also be seen as part of the measuring sensor 30. The voltage signal generated by the second measuring sensor 30 is forwarded directly to the evaluation unit 36 as a measuring signal. The second measuring sensor 30 is thus used to measure the temperature as the second physical measurement variable.

Moreover, a light detector is provided as the first measuring sensor 28 in FIG. 4. The first measuring sensor 28 is thus used to measure the light intensity as the first physical measurement variable. A light-emitting diode D1 is provided, which is arranged so that the light emitted by it at least partially penetrates a medium located in the domestic appliance 26, such as a solution of water with detergent, for example, and then encounters the light detector. The absorption behaviour or the light transmission of the medium can thus be determined. The light-emitting diode D1 emits light, the intensity of which depends on the current flowing through the light-emitting diode D1. This current is provided by the current source 11. The current source 11 can be controlled by the evaluation unit 36. The light detector comprises an electrical resistor R4 and a photodetector Q1 (e.g. phototransistor or photodiode). The voltage signal generated by the light detector is forwarded directly as a measuring signal to the evaluation unit 36.

Furthermore, in the embodiment shown in FIG. 4, a light reflection sensor is provided. This is provided by a light-emitting diode D2 and the light detector already described. The light-emitting diode D2 is operated by a current source 12, which can be activated by the evaluation unit 36. The light-emitting diode D2 is arranged such that it emits light in the direction of an element of the domestic appliance 26 or in the direction of a medium located in the domestic appliance 26, which light is then reflected at least partially by the element or medium and following reflection reaches the light detector. At a boundary surface from a liquid to gas, a different degree of reflection takes place than if only gas is present without such a boundary surface. The degree of reflection can also provide an indication of foam at the boundary surface, which is caused by detergent, for example.

It is thus advantageous if the light is emitted in the direction of a boundary surface potentially present in the domestic appliance 26 between a liquid and gas. To this end the sensor 20 can protrude at least partially into the wet chamber 8 of the washing machine 18 as depicted in FIG. 2.

The measuring sensor 34 shown in FIG. 3 is not depicted in the circuit in FIG. 4, but can be added there. Other measuring sensors can also be used instead of those shown in FIG. 4. It is further clear from FIG. 4 that the first measuring sensor 28 is arranged in a different branch circuit than the second measuring sensor 30. This means that the measuring signals of these measuring sensors 28, 30 are conducted via different electric lines to the evaluation unit 36. The measuring signals of the first and second measuring sensor 28, 30 cannot flow from one branch circuit to another branch circuit.

Figure 5:
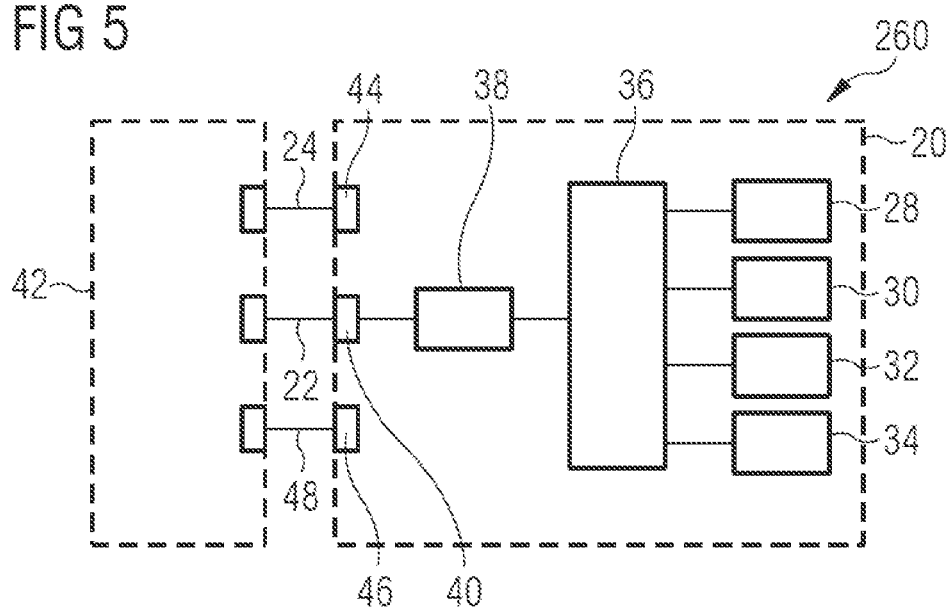
FIG. 5 is a schematic representation of a domestic appliance with the sensor.

FIG. 5 shows a schematic representation of a variant 260 of the domestic appliance 26 in FIGS. 3 and 4, wherein the domestic appliance 260 in this case also comprises a reference potential line (ground line) 48. Here also the same reference characters designate the components from FIGS. 2 to 4 already described. The reference potential line 48 is connected to a third electrical contact element 46 of the sensor 20. The third electrical contact element 46 is used to provide a reference potential in the sensor 20, in particular the third electrical contact element 46 makes a reference potential available to the sensor 20. In this variant, the sensor 20 comprises a maximum of three electrical contact elements for connection to lines of the domestic appliance 260, one of which is the first electrical contact element 40, another is the second electrical contact element 44, and another is the third single-pole electrical contact element 46.

Figure 6:
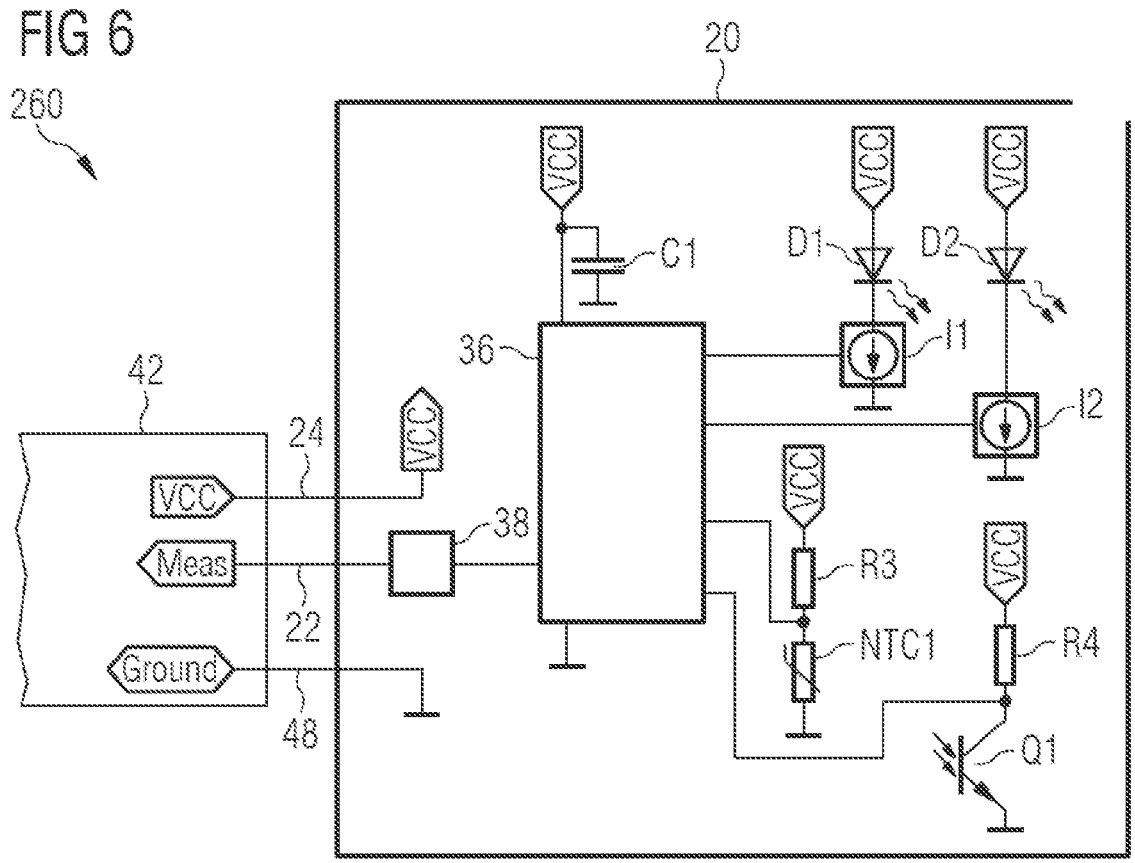
FIG. 6 is a representation of a circuit of the domestic appliance with the sensor.

FIG. 6 shows a representation of a circuit of the domestic appliance 260 in FIG. 5. It should be recognised that only the three lines 22, 24 and 48 are provided for connecting the sensor 20 to the main control unit 42. The output unit 38 in this variant can output a voltage signal as output signal, which is generated in relation to the reference potential provided by the third electrical contact element 46. The main control unit 42 uses the same reference potential as the sensor 20, which makes processing of the output signal by the main control unit 42 easier.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A sensor for cable connection to a main control unit of an electrical domestic appliance, the sensor for cable connection comprising:
    an electrical sensor circuit accommodated in a sensor housing with a plurality of at least two measuring sensors arranged in different branch circuits, each of which measuring sensors is designed to provide an electrical measuring signal, wherein the electrical sensor circuit has a first electrical contact element for plug connection to a cable plug and is able to output measurement information obtained via the first electrical contact element from the electrical measuring signals of each of the plurality of measuring sensors; and
    an evaluation unit designed to receive electrical measuring signals from the at least two measuring sensors, wherein the electrical measuring signals that are received by the evaluation unit are used to control an output signal generator, wherein the output signal generator is adapted to generate an output signal which contains or represents the measurement information, wherein the output signal is a time-variable electric voltage or a time-variable electric current, wherein the output signal generator is adapted to output the output signal via the first electrical contact element, wherein the first electrical contact element is connected to a signal line in a cable, connecting the sensor for cable connection to the main control unit of the electrical domestic appliance, wherein the cable comprises a voltage supply line connected to a second electrical contact element of the sensor for cable connection, wherein the second electrical contact element serves at least as a voltage supply to the evaluation unit, wherein the output of measurement information by the evaluation unit is controllable via a time-varying voltage or current signal that is applied by the main control unit of the electrical domestic appliance to the voltage supply line.

2. The sensor for cable connection according to claim 1, wherein a first of the at least two measuring sensors is designed for an optical measurement function and a second of the at least two measuring sensors is designed for a non-optical measurement function.

3. The sensor for cable connection according to claim 1, wherein one of the at least two measuring sensors is designed to measure the optical transmission along a light measurement path running partially outside of the sensor housing and/or to detect the nature of an external medium adjacent to an outside measuring surface of the sensor housing by means of a measuring light beam aimed in the direction of the measuring surface.

4. The sensor for cable connection according to claim 1, wherein one of the at least two measuring sensors provides a temperature measurement function and/or a measurement function for determining the electrical conductance along a conductance measuring section running outside of the sensor housing.

5. The sensor for cable connection according to claim 1, wherein the electrical sensor circuit is adapted to control the sensor for cable connection depending on control information received via the first electrical contact element.

6. The sensor for cable connection according to claim 5, wherein the electrical sensor circuit comprises an electrical resistor element, which is connected on an output side to the first electrical contact element and on an input side to a signal line of the electrical sensor circuit, wherein the electrical sensor circuit is adapted to output the measurement information by means of a voltage signal via the signal line.

7. The sensor for cable connection according to claim 6, wherein the electrical sensor circuit is adapted to determine the control information from a comparison between a voltage present on the input side of the electrical resistor element and a voltage simultaneously present on the output side of the electrical resistor element.

8. The sensor for cable connection according to claim 7, wherein the comparison comprises determination of one or more time sections in which only one of the voltage present on the input side of the electrical resistor element and the voltage present on the output side of the electrical resistor element exceeds a predetermined limit value.

9. The sensor for cable connection according to claim 1, wherein the second electrical contact element is for plug connection to the cable plug and is designed to obtain an electrical supply direct voltage.

10. The sensor for cable connection according to claim 1, wherein the electrical sensor circuit has a third electrical contact element for plug connection to the cable plug and parts of the electrical sensor circuit to be put to a reference potential are connected to the third electrical contact element.

11. The sensor for cable connection according to claim 1, wherein the electrical sensor circuit has a plug-in interface for an electrical connection plug, wherein the plug-in interface has a plurality of electrical contact elements for electrical supply of the electrical sensor circuit and to conduct away measurement information, wherein the plurality of electrical contact elements comprises the first electrical contact element, wherein the total number of contact elements of the plug-in interface is two or three.

12. The sensor for cable connection according to claim 1, wherein the electrical sensor circuit comprises an integrated circuit with separate signal inputs for an electrical measuring signal of a first of the at least two measuring sensors and an electrical measuring signal of a second of the at least two measuring sensors and with a common signal output for measurement information derived from the measuring signals.

13. The sensor for cable connection according to claim 1, wherein the sensor housing has a housing base and two housing fingers protruding with regard to the housing base.

14. The sensor for cable connection according to claim 1, wherein the electrical sensor circuit comprises at least one other measuring sensor, and conducts away all measurement information obtained by means of the measuring sensors of the electrical sensor circuit via a common contact element.

15. A water-using domestic cleaning appliance with a working wet chamber that can be closed by a door, the water-using domestic cleaning appliance comprising:
    the sensor for cable connection according to claim 1, wherein the sensor for cable connection is configured for performing measurements on a working medium present in the working wet chamber; and the main control unit, wherein the main control unit is connected via cable connection to the sensor for cable connection, which main control unit controls operation of the water-using domestic cleaning appliance on the basis of the measurements performed by the sensor for cable connection.

* * * * *